(12) United States Patent
Xiao

(10) Patent No.: US 7,125,130 B2
(45) Date of Patent: Oct. 24, 2006

(54) INTERIOR BLIND SPOT MIRROR

(76) Inventor: Xiaoda Xiao, 135 Belchertown Rd., Amherst, MA (US) 01002

( * ) Notice: Subject to any disclaimer, the term of this patent is extended or adjusted under 35 U.S.C. 154(b) by 109 days.

(21) Appl. No.: 10/775,697

(22) Filed: Feb. 11, 2004

(65) Prior Publication Data

US 2005/0063080 A1    Mar. 24, 2005

Related U.S. Application Data

(60) Provisional application No. 60/505,279, filed on Sep. 23, 2003.

(51) Int. Cl.
*G02B 7/182* (2006.01)
(52) U.S. Cl. ...................... 359/872; 248/477
(58) Field of Classification Search ........ 359/602–604, 359/871–872, 879–880; 248/475.1, 476, 248/477, 479, 481

See application file for complete search history.

(56) References Cited

U.S. PATENT DOCUMENTS

| | | | | |
|---|---|---|---|---|
| 3,741,632 A | * | 6/1973 | Stern | 359/603 |
| 3,928,894 A | * | 12/1975 | Bury et al. | 248/467 |
| 4,244,548 A | * | 1/1981 | Sharp | 248/481 |
| 4,558,840 A | * | 12/1985 | Manzoni | 248/549 |
| 4,614,412 A | * | 9/1986 | Cohen | 359/840 |
| 6,540,193 B1 | * | 4/2003 | DeLine | 248/481 |

* cited by examiner

*Primary Examiner*—Euncha P. Cherry

(57) ABSTRACT

An interior blind spot mirror which is mounted on the pillar of the window frame inside a vehicle on the driver's side, or on the passenger's side, completely eliminates the blind spot. The interior blind spot mirror includes an extension serving as a bridge between the mirror and the base which can be removed from the extension. There are two ball joints on either end of the extension which enable a user to conveniently adjust the mirror to a desired position. The base includes a soft pad sandwiched between the base and the double stick foam adhesive so that the base can fit pillars of different shapes. The interior blind spot mirror also includes an alternative base constructed of soft material such as polymer which can be mounted on different shapes of pillars of the window frames without the soft pad being attached to the bottom of the base. There is a mounting box on top of the base having a U-shaped notch into which the joint box on the lower end of the extension can be slidably affixed. In use, a driver of a vehicle should first mount the base on the pillar of the window frame on his/her left side, or on the passenger's side if necessary, and wait for three hours or more in order to let the adhesive reach its ultimate strength before inserting the extension of the mirror into the U-shaped notch on the mounting box.

15 Claims, 5 Drawing Sheets

INTERIOR BLIND SPOT MIRROR

This application claims benefit to U.S. provisional patent application No. 60/505,279 Sep. 23, 2003.

TECHNICAL FIELD

The invention relates to an interior blind spot rear view mirror for motor vehicles, and more specifically to a mirroring system having the standard adjustment features that allow a driver of a vehicle to adjust the mirror to such a desired position that the mirror of the present invention can meet the eye level of a driver, and completely eliminate the blind spot. The interior blind spot mirror of the present invention includes a rectangular, or oval-shaped mirror constructed of convex glass or plexiglas, a curving extension which serves as a bridge between the above mentioned mirror and a separate base which has a pad constructed of resilient material such as polymer attached to the bottom of the separate base. Two double stick foam attachment means attached to the above mentioned pad to enable the separate base of the interior blind spot mirror to be fitfully mounted to any type of the window frames of motor vehicles which are defined hereafter as pillar(s) and provide a secure base for the mounting of the interior blind spot mirror of the present invention. Specifically, the present invention is a mirror which can be rectangular or oval-shaped and which includes a round, curved extension attached on the back of the mirror serving as a bridge between the mirror and a separate base. A ball joint is placed on either end of the extension, the function of which is to flexibly and yet substantially secure the blind spot mirror to a chosen position from which it can reflect whatever is within the blind spot. Additionally, the interior blind spot mirror of the present invention can also be mounted on the passenger's side to further provide a device that can eliminate the blind spot on the passenger's side.

A separate base of the interior blind spot mirror includes a U-shaped mounting box on top into which the extension of the mirror is slidably affixed. Because of a pad of soft attachment on the bottom of the separate base of the present invention, the separate base provides a flexible attachment to all types of pillars, whether it is curving, square or flat, and therefore enables the interior blind corner mirror of the present invention to fit all types of vehicles including cars, vans and trucks.

BACKGROUND INFORMATION

Constant lane-switching, which is inevitable while driving on a busy highway, has been causing greater inconvenience for a driver of a motor vehicle today than five years ago, and it goes without saying that the situation will aggravate in the next five years due to the rapidly increasing number of cars which make the already crowded highway system, especially around metropolitan, or densely populated urban areas become more crowded. As a result, while driving in highway zones like that, a driver has to constantly turn his/her head around to look backward at what is known as the blind spot, a spot neither the interior rearview mirror, nor the exterior side rear-view mirror of a vehicle is able to reflect, to make sure there is not a passing vehicle there before he/she switches to the passing lane.

For the better part of history, automobiles don't have a blind spot mirror to speak of, although accidents caused directly or indirectly due to the failure of noticing the blind spot had concerned the insurance companies, the engineers and designers in the profession for a long period of time, especially since the last quarter of the twentieth century. In more recent years, a round convex mirror known as fisheye was invented to install on top of the side rearview mirror to serve, by using its unique feature of convexity to widen the capacity of a conventional mirror's reflecting coverage, as the blind spot mirror. And upon the invention of this tiny convex mirror an improvement was made and a larger, round convex mirror was built to install on trucks, usually below the exterior side rearview mirror to serve as a blind spot mirror. Since the improved convex mirror was larger than "the fisheye", its capacity of reflecting coverage was greater than its predecessor's. And a relatively smaller round convex mirror was consequently made to attach on top of the exterior side rearview mirror by means of double stick foam adhesive to serve as the blind mirror for smaller vehicles such as family cars, vans, jeeps etc.

Literally, many prior art patents exist in this area of technology which, in theory, should substantially eliminate the blind spot. In reality, however, none of them is able to convince a driver that the blind spot has been completely eliminated, on the contrary, due to the position of the exterior rearview mirror upon which the convex blind mirror was attached, the round convex blind spot mirror, while reflecting images inside the blind spot mirror, will also reflect images which are not in the blind spot. As a result a driver has to discern which one of these images is inside the blind spot and which is not. Moreover, only those bigger vehicles such as trucks and buses have enough room for the installation of a full-sized convex mirror without sacrificing the area of the side rearview mirror, as the exterior convex blind spot mirror can only be installed outside the vehicle, a family vehicle has to sacrifice at least one third of the area of its side rearview mirrors in order to put on an exterior blind spot mirror.

These deficiencies of the exterior blind spot mirror limited its application, while on the other hand the request of the blind spot mirror for automobiles, especially family vehicles whose numbers are increased rapidly in recent years become more urgent. And it is commonly acknowledged that the lacking of a blind spot mirror is one of the most dangerous factors that may cause terrible accidents on highways.

Clearly, the invention of the exterior convex blind spot mirror is the advancement in the area of safety to the drivers under heavy traffic circumstances, yet this advancement is only applicable to bigger vehicles such as trucks, buses which have enough room below the side rearview mirror for the installation of the exterior convex blind spot mirror. That is, an exterior convex blind spot mirror is only effective when it is used properly for bigger vehicles, although, of course, due to the limitation of its position, the exterior convex blind spot mirror doesn't provide for a driver of a bigger vehicle with a complete view when a small vehicle passes by.

Since such an advancement is not properly done, a small-sized vehicle such as a family car, a van, or a pick-up etc. still suffers the inconvenience caused by the blind spots.

A number of blind spot mirrors have been developed which attempt to properly eliminate the blind spots. Examples of this prior art of blind spot mirrors include U.S. Pat. No. 4,182,552 discloses a composite mirror assembly adapted to be mounted adjacent the driver of a vehicle to enable the driver to view objects within an area normally hidden from view by conventional vehicle mirrors. An additional mirror is positioned at an angle with respect to the conventional side mirror.

U.S. Pat. No. 4,200,359 discloses a small, flat mirror being mounted through use of a wedge-shaped adhesive block to the inside portion of a conventional side view mirror. The block positions the small mirror at an angle of about 15 degrees to 20 degrees with respect to the plane of the side view mirror to thereby eliminate the blind spot.

U.S. Pat. No. 5,044,739 discloses a smaller auxiliary convex mirror mounted on a larger mirror so that the smaller auxiliary convex mirror may be tilted to a limited extent to more precisely position the wide angle field of view it provides. The convex mirror is attached to a tilting plate by an adhesive means, and the tilting plate has a central projecting member with a cavity. A support plate attached to the smooth base mirror by another adhesive means has a corresponding central bar with a spherical head which engaged in the cavity of the tilting plate so that the convex mirror and tilting plate are pivotable.

U.S. Pat. No. 5,566,028 discloses an apparatus, which exposes the blind spot in the direction in which a vehicle makes a turn, to be installed at the back of mechanically or electrically operated side rearview mirrors. A mechanical device, connected to a mirror unit and to the frame, having a diaphragm sealingly disposed therein. When a winker switch is activated, the diaphragm housing is activated by vacuum, causing the diaphragm to be sucked backwards, resulting in said mirror unit pivoting backwards to expose the blind spot . . .

U.S. Pat. No. 6,076,934 discloses a vehicle blind spot mirror with a mirror having a single plane outwardly curved surface, and extension member attached to the rear portion of the outwardly curved mirror and having a double stick foam tape attachment means on the opposite surface of the extension, allowing the extension and attached blind spot mirror to be affixed to a vehicle's existing rearview mirror even if the rear view mirror is set in a recessed frame, thereby allowing for a larger blind spot mirror than the original rearview mirror.

U.S. Pat No. 6,523,965 discloses an improved mirror for use on most types of motor vehicles (cars and trucks) includes two flat reflecting surface used as the principal rearview mirror, and a second reflecting surface being oriented so as to provide a reflected image of traffic in the blind spot mirror. A support structure holds the principal reflecting surface bound to the larger reflecting surface, the blind spot mirror. Although the blind spot mirror is larger, only portions of it appear to the driver as it is mostly covered by the principal reflecting surface. The support structure between the two reflective surfaces has the shape of a wedge necessary for maintaining the blind spot mirror at the proper angle so as to reflect blind spot traffic to the eye of the driver.

Although these prior art blind spot mirror units are adequate for the purpose for which they were intended, these devices either fail to completely eliminate the blind spot or cast the intactness of the side rearview mirror by taking a considerable portion of the side rearview mirror for the attachment of the blind spot mirror. The conventional side rearview mirror of the driver's side, which is just big enough for a driver of a vehicle to view objects within that angle, will become rather ineffective even if a quarter of it is taken for the installation of the blind spot mirror, leave alone the possibility of visionary confusion, such as broken, fragmental images in both mirrors, that the combination of the two mirrors will cause.

Therefore, the prior art blind spot units are only suitable for a bigger vehicle such as a truck, a school bus that has enough rooms below the side rearview mirrors on either side of the driver for the installation of the blind spot mirror units.

It would obviously be preferable to provide a more effective, flexible device for smaller vehicles to eliminate the blind spot without sacrificing the conventional side rearview mirrors.

SUMMARY OF THE INVENTION

It is an object of the present invention to provide an interior blind spot mirror capable of covering the dead angle and completely eliminating the blind spot.

It is another object of one or more embodiments of the present invention to provide an interior blind spot mirror that can be flexibly mounted on the window frame so that it fits all types of motor vehicles, especially for family cars, vans, and trucks as well.

It is another object of the present invention to provide an interior blind spot mirror which, after being mounted on the window frame, can be adjusted to fit drivers of different height.

It is another object of the present invention to provide a separate base for the interior blind spot mirror that can fit all types of pillars of the cars windows.

It is another object of the present invention to provide an interior blind spot mirror to be flexibly taken off and mounted on the separate base.

It is another object of the present invention to provide an interior blind spot mirror that comprises a separate base so that a user of the present invention can mount the base which has a double foam stick attachment means on its bottom onto a pillar and allow the adhesive to reach its ultimate strength before mounting the blind spot mirror on the separate base.

It is another object of the present invention to provide an interior blind spot mirror that comprises a U-shaped mounting box on top of the separate base so as to enable the extension of the interior blind spot mirror to be slidably affixed to the separate base.

It is another object of the present invention to provide an interior blind spot mirror having a base constructed of soft resilient material that enables the base to fit various types of pillars of the window frames of vehicles.

It is another object of the present invention to provide an interior blind spot mirror that is cost efficient to install in a vehicle, making the vehicle safer.

It is another object of the present invention to provide an interior blind spot mirror to the passenger's side to eliminate the blind spot on the right side of the vehicle.

It is a further object of the present invention to provide an interior blind spot mirror which is of simple construction, which achieves the stated objects in a simple, effective and inexpensive manner, and which solves problems and satisfies needs existing in the art.

These and other objects and advantages are obtained by the interior blind spot mirror of the present invention, the general nature of which may be stated as including a mirror (rectangular or oval) having an extension, two ball joints, a U-shaped mounting box and a separate base which is removably attached to the interior side window frame of a vehicle.

BRIEF DESCRIPTION OF THE DRAWINGS

The preferred embodiments of the invention, illustrative of the best mode in which The inventor has contemplated applying the principles, are set forth in the following description and are shown in the drawings and are particularly and distinctly pointed out and set forth in the appended claims.

DETAILED DESCRIPTION OF THE PREFERRED EMBODIMENT

Figure 1:
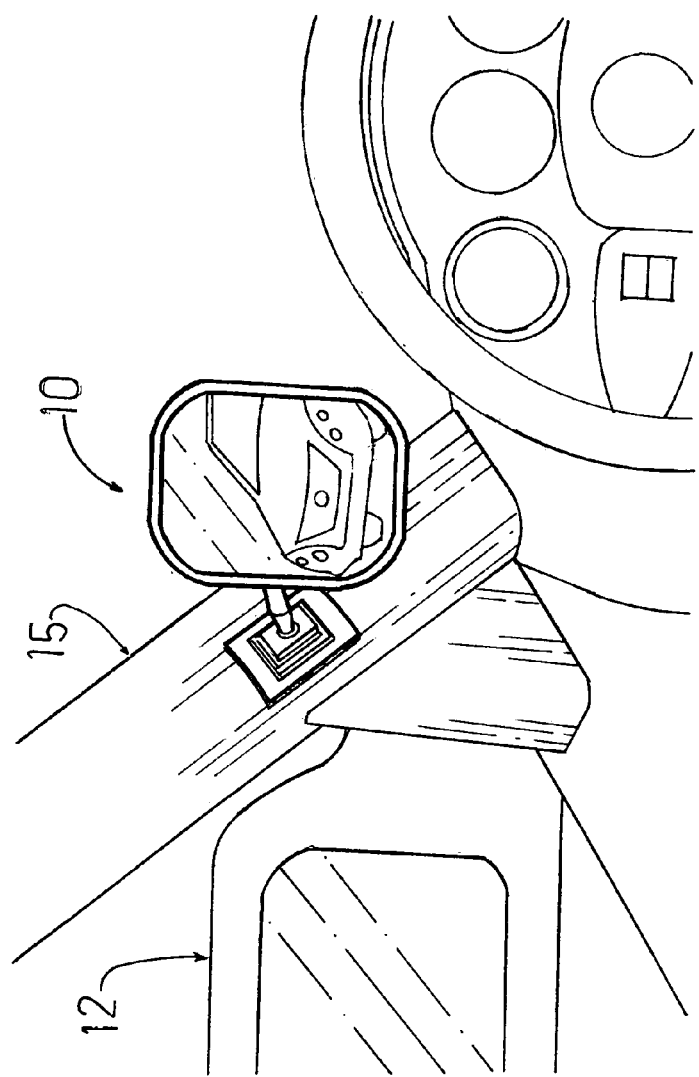
FIG. 1 is a front view of the interior blind spot mirror of the present invention showing the mirror properly positioned to show a passing car in what is defined as the blind spot on the driver's side.
Figure 2:
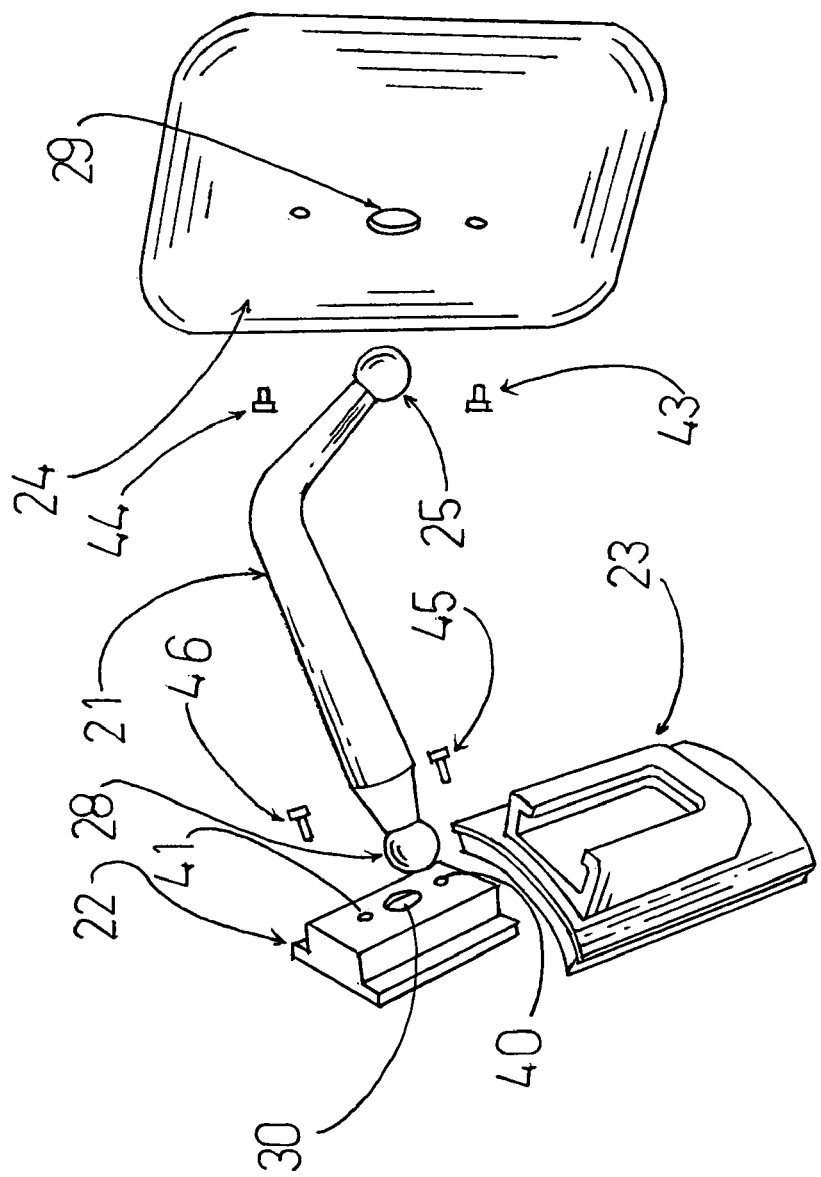
FIG. 2 is a rear view of the interior blind spot mirror of the present invention showing the mirror, the first ball joint between the mirror and the extension, the extension, the second ball joint between the extension, the joint box, and the separate base.
Figure 3:
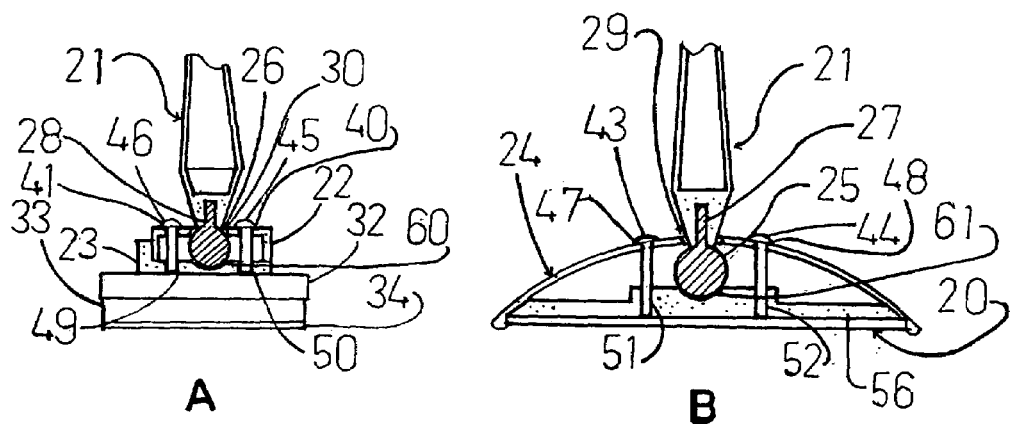
FIG. 3, including A and B, are two section views of the ball joints and the structural detail of the interior blind spot mirror, the extension and the joint box.

Accordingly, the interior blind spot mirror of the present invention is shown in FIG. 1, 2 and is indicated at 10 which generally includes a rectangular or oval-shaped mirror 20, an extension 21 seen in FIGS. 2, 3, 4, 6 and 7, and a separate base 23 seen in FIG. 2. Having the capacity of reflecting whatever is hidden in the blind spot, the interior blind spot mirror of the present invention provides for a driver with such a device that prevents him/her from turning around to look backward to check if there is a passing vehicle hidden inside the blind spot while driving.

Figure 4:
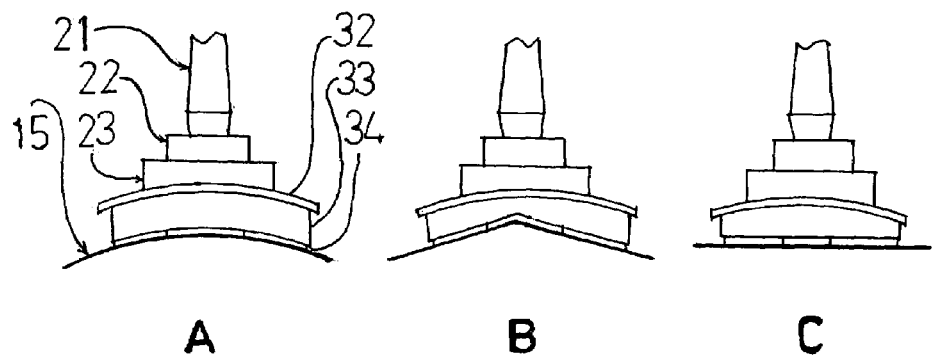
FIG. 4 includes three side elevations of the separate base when they are mounted on three geomorphically different surfaces, the curving, the square and the flat.
Figure 6:
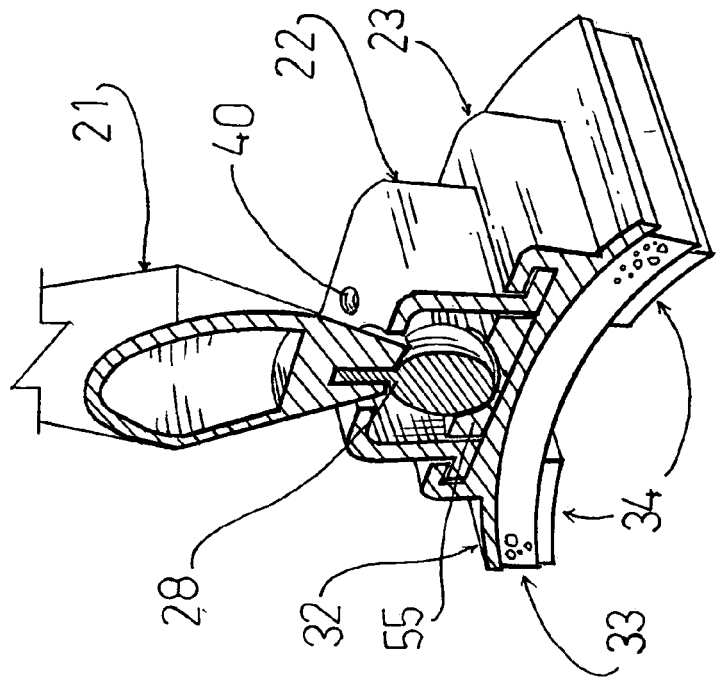
FIG. 6 is a sectional perspective of the second ball joint showing the relationship between the extension, the ball joint, the joint box, the separate base, the soft pad and the double side foam attachment.
Figure 7:
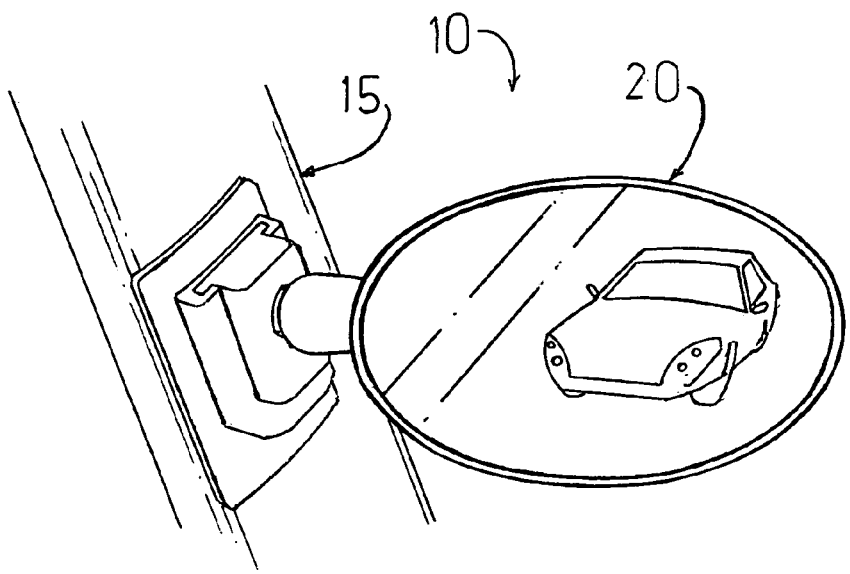
FIG. 7 is a front elevation of an oval-shaped mirror which has a soft base that can fit pillars of different contours.

Although base 32 of the interior blind spot mirror of the present invention shown in FIG. 4 can be installed on different shaped window frames of vehicles by means of applying a pad of soft resilient material sandwiched between said separate base 32, and double stick foam attachment means 34 as seen in FIG. 4, the interior blind spot mirror of the present invention can also be mounted on all types of pillars by applying a soft base which is constructed of polymer or other soft materials as seen in FIG. 7.

FIG. 1 illustrates that, when properly positioned, the interior blind spot mirror of the present invention is able to reflect a passing vehicle inside the blind spot. The interior blind spot mirror 10 is mounted on pillar 15 of a vehicle and forms 7–10 degrees with the exterior side rearview mirror 12, in which position the interior blind spot mirror of the present invention can completely eliminate the blind spot.

Figure 5:
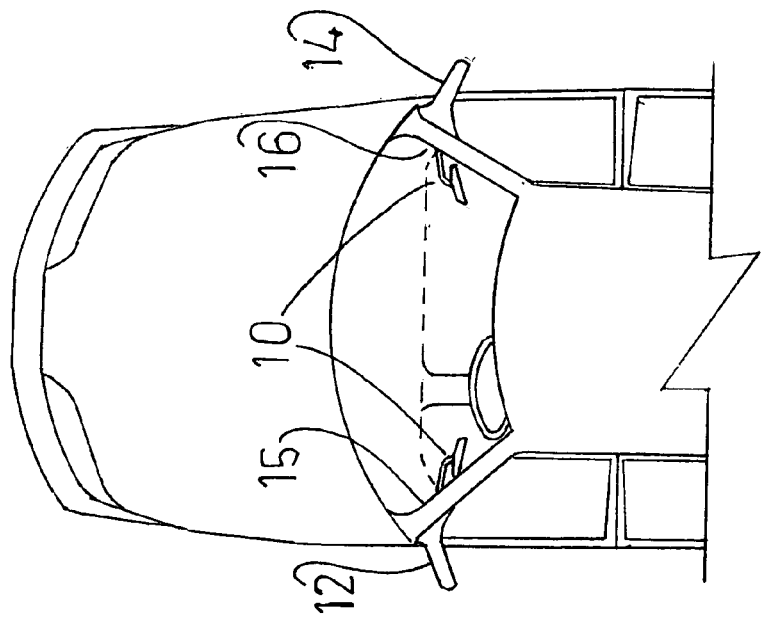
FIG. 5 is a top view of a car with two interior blind spot mirrors mounted on both pillars of the window frames inside the vehicle.

Along with other parts, FIG. 2 illustrates that the interior blind spot mirror of the present invention has two ball-joints 25 and 28 at either end of extension 21 which has a curving upper part. Having mounted the interior blind spot mirror of the present invention on the pillar of the window frame 15, as is seen in FIG. 1, a driver of a vehicle can easily position said interior blind spot mirror 10 in a generally parallel relationship with exterior rearview mirror 12 by adjusting the two ball joints of which one controls extension 21, the other, mirror 20. After this is done, a driver can further adjust mirror 20 in the same manner until said mirror reflects the window on his/her left side. If he/she can see in the mirror the major part of the window on his/her left side, the blind spot on that side is eliminated. With the same method said interior blind spot mirror 10 can be mounted on pillar 16 as seen in FIG. 5 and the blind spot on the passenger's side can be completely eliminated, too. Each of said two ball joints includes a base board that is fixed in a tightly frictional manner with said ball by two screws as seen in FIGS. 3A and B. FIG. 3A shows the top rod of ball 28 being inserted into the lower end of extension 21 while the bottom of ball 28 fits into a concave defined as ball pit 60 on base board 55 which has two holes on either side of said ball pit to hold screws 45 and 46. Said ball 28 and said base board 55 are confined in box 22, and said two bolts 45 and 46 control the tautness of the friction between said ball 28 and said base board 55. The purpose here is to make extension 21 be adjustable in all directions and yet be affixed in any position. FIG. 3B indicates that the top rod of ball 25 being inserted into the upper end of extension 21 and the bottom of ball 25 fits into ball pit 61 on base board 56, and two bolts 43 and 44 control the tautness of the friction between said ball 25 and said base board 56 which is located inside back cover 24 of mirror 20. The purpose here is to make said mirror 20 be adjustable in all directions.

FIGS. 4A, B and C are three embodiments of the separate base of the interior blind spot mirror of the present invention applied on three typically different shaped pillars of the window frames of the vehicles. Between separate base 32 and double stick foam attachment 34 is a pad of soft resilient material such as polymer that enables separate base 32 to fit different shaped pillars. Said separate base 32 includes a U-shaped mounting box 23 on the top so that the bottom of joint box 22 can be slidably fit into said mounting box 23 and said interior blind spot mirror of the present invention is in position. In use, a driver should mount separate base 32 onto pillar 15 and then, in order to let the adhesive material reach its ultimate strength, waits for a couple of hours (or longer) before mounting said mirror 20 on it.

To mount the interior blind spot mirror of the present invention on the pillar on the driver's side of a vehicle, a user should first measure the interior blind spot mirror of the present invention on the pillar of the window on his/her left side with the top of said mirror 20 about two inches higher than the top of said side rearview mirror 12. When that is done, a user may take said separate base 32 off said joint box 22 on the bottom of said extension 21, and then peel off the tape on the double stick foam adhesive; and then press said separate base 32 on the spot chosen for the mounting of the interior blind spot mirror of the present invention. Having fixed said separate base 32 on pillar 15, a user should wait for at least two hours to let the adhesive reach its ultimate strength before inserting said extension 21 of the present invention into said mounting box 22.

When the interior blind spot mirror of the present invention is properly mounted on pillar 15, a user can adjust mirror 20 by turning both extension 21 and mirror 20 until the blind spot completely disappears. The blind spot mirror of the present invention can also be mounted on pillar 16 of a vehicle on the passenger's side, as a result of which the blind spot on the passenger's side can be eliminated, too.

The main structures of the present invention, such as said separate base 32, said extension 21, said mirror frame 24, said ball joint 27 and 28 are constructed of ABS plastic while said bolts 43, 44, 45, 46 are constructed of alloy or stainless steel; said mirror 20 is constructed of antiglare, shatterproof glass or plexiglas and is made convex. Said pad 33 is constructed of resilient material such as polymer to enable said base 32 to fit different shaped pillars as is shown in FIG. 4; and said double stick foam adhesive 34 is a kind of adhesive for plastic, leather and synthetic materials.

Figure 8:
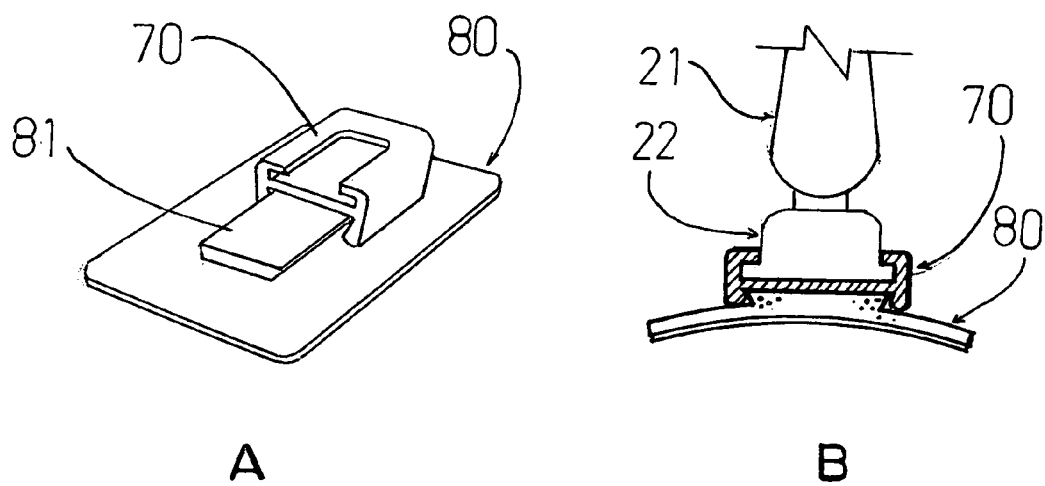
FIG. 8A shows the wedging connection between the soft base and the U-shaped mounting box.
FIG. 8B is a section of the soft base when it is connected with the mounting box and the extension of the interior blind spot mirror on the top.

FIG. 8 shows the embodiment of soft separate base 80, an alternative of separate base 32, featuring with central piece 81, a protuberant, rectangular piece with wedged-in edges, of which the purpose is to enable U-shaped mounting box 70, which also has wedged-in sides, to be fixed on said base 80. Being constructed of soft material such as polymer, said soft separate base 80 can fit all geomorphic surfaces more properly than said separate base 32, and looks better than said separate base 32 because the former is thin and of one piece while the later has a pad that is at least as thick as four millimeter.

What is claimed is:

1. An interior blind spot mirror, comprising:
a mirror having one of a rectangular and an oval shape,
the mirror being one of a shatterproof glass and a plexiglas,
the mirror finished with an antiglare coating,
the mirror being one of a convex surface and a flat surface;
a plastic mount supporting the mirror,
the plastic mount having a curving back exterior surface and a mounting hole in a center of the back;
an extension arm comprising a first ball joint located at a first end of the extension arm,
the first ball joint mounted in the mounting hole of the plastic mount;
a frictional board with a centrally-located ball pit,
the frictional board located inside the plastic mount intermediate the plastic mount and the mirror; and
an exterior accessible adjustment, extending through the plastic mount and acting in cooperation with the frictional board for adjusting a tightness of the first ball joint against the plastic mount.

2. The mirror of claim 1, further comprising:
a mounting base with a mounting surface for detachably mounting the mounting base to a surface,
the extension arm connecting the mounting base to the plastic mount.

3. The mirror of claim 2, further comprising:
a ball joint box secured to the mounting base; and
a second ball joint located at a second end of the extension arm,
the second ball joint mounted within the ball joint box, wherein,
each end of the extension arm provides a flexible adjustment point so that the mirror can be flexibly adjusted at either end of the extension arm.

4. The mirror of claim 3, further comprising:
a mounting box with a U-shaped top surface within the mounting base,
the mounting box slidably accepting the ball joint box so that the ball joint box is slidably affixed within the mounting base against the U-shaped top surface.

5. The mirror of claim 3, further comprising:
a pad of resilient material attached to a bottom of the mounting base, the pad allowing mounting of the mounting base by fitting to different shaped vehicle pillars.

6. The mirror of claim 5, further comprising:
a double-stick foam adhered to a bottom of the pad, the double-stick foam allowing mounting the mounting base to a side pillar of a vehicle window frame.

7. The mirror of claim 3, wherein,
the mounting base comprises i) a central piece of a protuberant, rectangular shape and with wedged-in edges along a major axis, and ii) a U-shaped mounting box with wedged-in sides,
the mounting box slidably accepting the ball joint box so that the ball joint box is slidably affixed within the mounting base against the U-shaped mounting box,
the ball joint box glued into the mounting box.

8. The mirror of claim 6, further comprising:
a mounting box comprising wedged-in edges on a major axis,
the mounting box provided on a protuberant central piece of the mounting base.

9. The mirror of claim 3, further comprising:
four screws for adjusting the friction applied against the first and second ball joints.

10. The mirror of claim 9, wherein,
the frictional board with a centrally-located ball pit comprises a screw hole on each of two sides of the ball pit,
each screw hole securing one of the four screws,
the ball joint box comprises a frictional board with a centrally-located ball pit and a screw hole on each of two side of the ball pit, the screw holes of the ball joint box frictional board each securing one of the four screws, wherein,
user-adjustment of the screws adjusts the friction applied against the first and second ball joints.

11. The mirror of claim 1, further comprising:
a mounting base with a mounting surface for mounting the mounting base on either of a driver side and a passenger side pillar of a vehicle front window frame,
the extension arm connecting the mounting base to the plastic mount.

12. An interior blind spot mirror, comprising:
a mirror having one of a rectangular and an oval shape,
the mirror being one of a shatterproof glass and a plexiglas,
the mirror finished with an antiglare coating,
the mirror being one of a convex surface and a flat surface;
a plastic mount supporting the mirror,
the plastic mount having a curving back exterior surface and a mounting hole in a center of the back;
an extension arm comprising a first ball joint located at a first end of the extension arm,
the first ball joint mounted in the mounting hole of the plastic mount;
a frictional board with a centrally-located ball pit,
the frictional board located inside the plastic mount intermediate the plastic mount and the mirror; and
an exterior accessible adjustment part, extending through the plastic mount and into the frictional board, the adjustment part providing user-adjustment of a tightness of the first ball joint against the plastic mount.

13. The mirror of claim 12, wherein the frictional board further comprises two planar surfaces extending along a longitudinal length of the mirror on two sides of the ball pit.

14. The mirror of claim 13, wherein,
the adjustment part comprises two screws for adjusting the friction applied against the first ball joint.

15. The mirror of claim 14, wherein,
the frictional board with a centrally-located ball pit comprises a screw hole on each of two planar surfaces extending on the two sides of the ball pit,
each screw hole securing one of the two screws, wherein,
user-adjustment of the two screws adjusts the friction applied against the first ball joint.

* * * * *